Feb. 25, 1964    F. SINGER ETAL    3,122,084
PHOTOGRAPHIC CAMERA
Filed June 27, 1960    2 Sheets-Sheet 1

3,122,084
PHOTOGRAPHIC CAMERA
Franz Singer, Munich, and Günther Fauth, Grosshesselohe, Germany, assignors to Compur-Werk Friedrich Deckel OHG, Munich, Germany, a firm of Germany
Filed June 27, 1960, Ser. No. 38,841
Claims priority, application Germany July 25, 1959
5 Claims. (Cl. 95—64)

The present invention relates to a photographic camera and, more particularly, to a depth of field indicating mechanism having a pair of pointers movable across the adjustable focusing scale on the camera.

An object of the invention is to provide a new and improved depth of field indicating device for a photographic camera which is coupled with the aperture setting mechanism.

Another object is the provision of a depth of field indicating device with movable pointers for a camera in which the mechanism for focusing the camera and adjusting the diaphragm aperture are permanently coupled together.

A further object is to provide a camera of the foregoing kind adapted to be coupled with the follow-up pointer of an exposure meter.

A still further object is the provision of a new and improved camera arranged to be easily set to make an exposure, while yet being inexpensive to manufacture.

Figure 1:
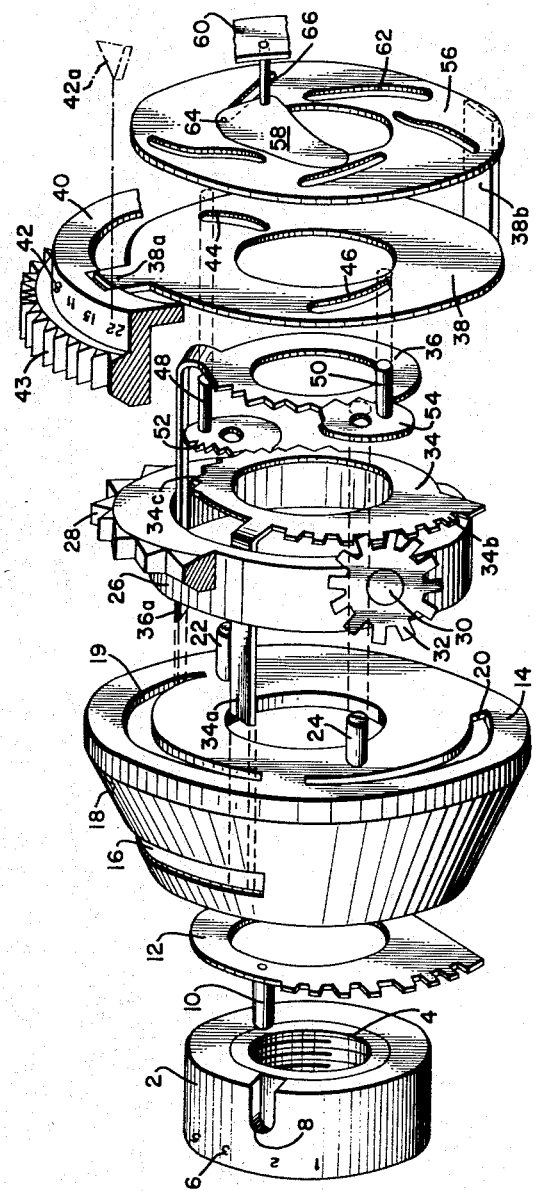
Figure 2:
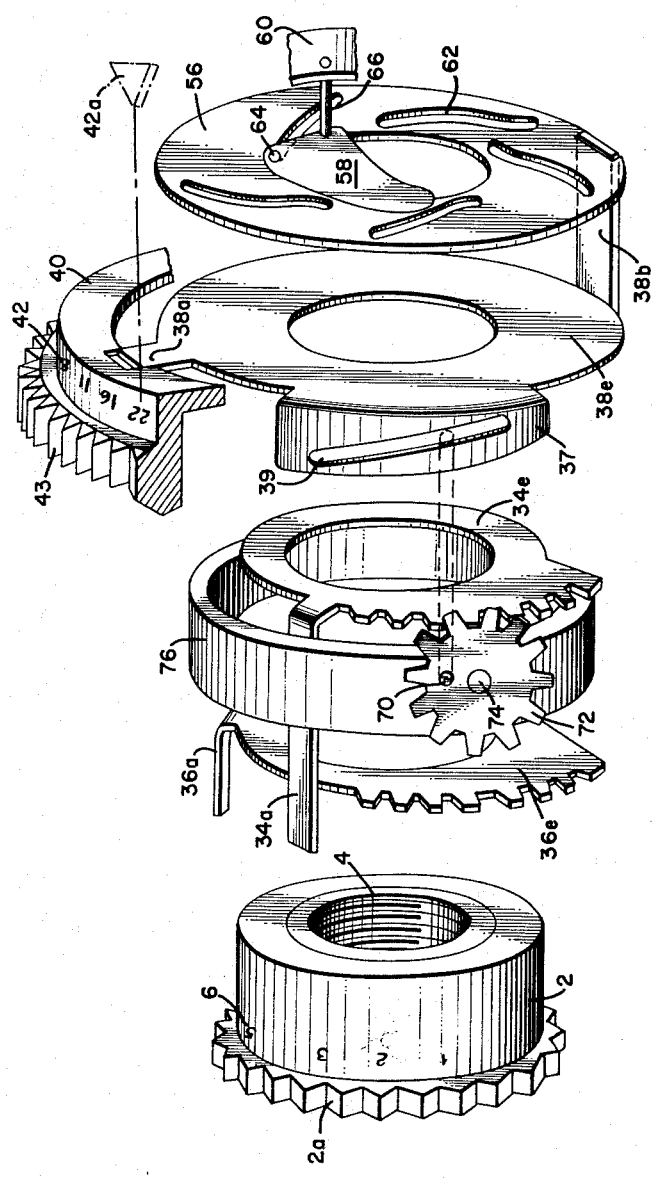

These and other desirable objects may be attained in the manner disclosed as an illustrative embodiment of the invention in the following description and in the accompanying drawings forming a part hereof, in which:

FIG. 1 is an exploded perspective view, with portions broken away and shown diagrammatically, of a depth of field indicating mechanism according to the invention; and FIG. 2 is a view similar to FIG. 1 of a second embodiment of the invention.

The same reference numerals throughout the several views indicate the same parts.

In FIG. 1 a focusing tube or ring 2 is provided for mounting one or more lens elements of the movable objective of a photographic camera, not here shown. The focusing tube 2 has an internal thread 4 for displacing the objective or member of the objective axially upon rotation of the tube about the optical axis. A circumferentially graduated focusing scale 6 is carried by the periphery of the tube 2.

The focusing ring 2 furthermore has a rearwardly opening axial slot 8 which engages an entraining arm 10 of a ring 12 rotatable about the optical axis and having gear teeth cut into a portion of its periphery. The ring 12 and focusing tube 2 are mounted within a truncated cone-shaped casing 14 and are fixed as to their axial position. A slot 16 in the shell of casing 14 forms a window through which the focusing scale 6 may be observed, readings being taken of the focused distance by reference to an index mark 18 on the casing 14. It is immaterial to the present invention whether the casing 14 contains an objective shutter of known form of construction, or whether it merely forms the front cover of such a shutter, or whether it is directly secured to the body of the camera. The rear wall of the casing 14 has a pair of arcuate slots 19 and 20 and two axially extending pins 22 and 24 whose purpose will be explained later.

A differential ring 26 is rotatably mounted on the rear face of the casing 14 so as to be non-displaceable in an axial direction, and has a milled edge 28 accessible for manual operation. The ring 26 is provided with a radially projecting pin 30 upon which is rotatably mounted a small spur wheel 32. A first pointer ring 34 has a forwardly extending pointer arm 34a and is provided with two toothed sections 34b and 34c. The toothed section 34b is in meshing engagement with the spur wheel or pinion 32. A second pointed ring 36 has a forwardly extending pointer arm 36a and only one toothed section on its periphery similar to the teeth 34c. A control ring 38 is also provided having a radial arm 38a and an axial arm 38b. The three rings 34, 36 and 38 are mounted coaxially with the casing 14 in such a way that they can be rotated but not moved in an axial direction. Suitable bearings of this kind are well known and are not shown in the drawing to avoid unnecessary complications. For instance, an objective tube may be used for mounting these rings.

The pointer arms 34a and 36a on the rings 34 and 36 project through the slot 19 in the rear wall of the casing 14 and indicate a range of distances on the focusing scale 6 extending symmetrically on either side of the mark 18. The control ring 38 is coupled for rotation with a diaphragm aperture setting member 40 by means of the arm 38a on ring 38 engaging in a radial slot in the ring 40. The setting ring 40 bears a circumferentially graduated aperture scale 42 and is manually adjustable with respect to an index 42a by grasping and turning a milled edge 43 on the ring 40. Rotatable mounting of the ring 40 without axial movement may be accomplished in any one of various manners.

The pointer rings 34 and 36 are driven by the control ring 38. For this purpose the ring 38 has two similar cam slots 44 and 46 in which are slidably engaged pins 48 and 50 respectively projecting eccentrically from partly toothed pinions 52 and 54. The pinion 52 meshes with the teeth 34c on pointer ring 34, while pinion 54 meshes with pointer ring 36. The gears 52 and 54 are mounted in stationary position on the respective pins 22 and 24 projecting from the face of casing 14. The arm 38b on ring 38 is secured to the movable blade actuating ring 56 of an iris diaphragm mechanism, to couple the diaphragm setting mechanism permanently with the depth of field indicating pointers 34a and 36a. The iris diaphragm may be of conventional construction and additionally includes a stationary ring 60 having fixed pins 66 on which the diaphragm leaves 58 are pivoted. Movable pivots 64 on the leaves 58 are engaged in cam slots in the actuating ring 56, to swing the diaphragm leaves about the pivots 66 when the ring 56 is rotated.

The small spur wheel 32 extends through the other slot 20 in the casing 14 and is in meshing engagement with the teeth on the ring 12. The pointer ring 34 and its gear teeth 34b, the differential ring 26 together with pinion 32, and the partially toothed ring 12 together form a differential gear with two adjustable input members, namely the differential ring 26 and pointer ring 34. The output member to which the adjusting motions are transferred is the ring 12.

The operation of the FIG. 1 embodiment is that when differential ring 26 is rotated, pinion 32 rolls on the toothed periphery 34b of the stationary pointer ring 34 and thus causes ring 12 to rotate in the same direction as the differential ring 26 but at twice its angular speed. Pointer ring 34 remains stationary during this adjustment due to the self-locking effect of the sliding slot crank motions of the pin 48 in slot 44 and the pin 50 in slot 46. Because of the coupling between the focusing tube 2 and the ring 12, the tube 2 also rotates, causing the objective to be focused and the angular position of the focusing scale 6 to be changed in relation to the two pointers 34a and 36a, as well as to the fixed index mark 18. In the finally adjusted position, the focused distance is indicated by mark 18, the near limit of clear definition by pointer 34a and the distant limit of clear definition by pointer 36a.

For the setting of a particular selected diaphragm aperture, the aperture setting ring 40 is adjusted while the differential ring now remains stationary due to the requisite amount of friction in its bearing or by the provision of a suitable light arresting means or detent means. Rotation of the ring 40 is transmitted to the control ring 38, and the slot 44 sliding on the pin 48 and the slot 46 sliding on the pin 50 actuates the pointer rings 34 and 36 to rotate in opposite directions. The change in depth of field associated with the change in aperture of the diaphragm will therefore be reflected in an adjustment of the length of the arc defined by pointers 34a and 36a on the focusing scale 6. The effect of the differential gearing is that the tube 2 and ring 12 rotate contrary to the direction of pointer ring 34 and in the same direction as pointer ring 36. Owing to the relative size and arrangement of the parts, the angular speed of the focusing tube 2 is the same as that of the pointer ring 36, and the position of pointer ring 36 in relation to the focusing scale 6 will not change.

A camera fitted with the focusing mechanism which has been described has the following adjustment characteristics. Focusing or adjustment of the distant limit of clear definition is achieved by rotating the milled ring 28 and differential gear 26, to aline the selected value on the scale 6 with the index 18. The diaphragm aperture is set by rotating the milled ring 40, and this adjustment will leave the previously focused distant limit of clear definition unchanged.

Because of these characteristics the focusing mechanism of the invention is especially suited for use in conjunction with a follow-up device of an exposure meter. In such a follow-up device, a follow-up pointer is coupled for actuation by an aperture setting member or an exposure value setting member, and can be moved into coincidence with the needle of a built-in exposure meter for the purpose of exposing the film according to the amount of light measured. The coupling of the follow-up pointer to the aperture setting member or the exposure value setting member may be accomplished in any conventional manner known to those skilled in the art, e.g., as shown in Fahlenberg Patent 2,849,936, granted September 2, 1958, or in Sommer Patent 2,926,571, granted March 1, 1960, or in Gebele Patent 2,949,069, granted August 16, 1960, on an application filed in 1958.

In view of the symmetry of the pointer mechanism it is of course possible to use the pointer ring 36 instead of the pointer ring 34 as the sun wheel of the differential gear for the purpose of holding the near limit of clear definition when the diaphragm aperture is changed. Moreover, the scope of the invention is not limited to a mechanism which is coaxial with the optical axis as shown in FIG. 1.

A more compact arrangement of the gearing for driving the pointers is embodied in a modification of the invention illustrated in FIG. 2. In this form of the invention, however, the focusing of the tube 2 is independent of the depth of field indicating pointers and the diaphragm setting parts. The control ring 38e in this case (corresponding in general to the control ring 38 in the previous embodiment) has a peripheral extension 37 formed as part of the shell of a cylinder and is provided with a cam slot 39. This cam slot is engaged by a driving pin 70 mounted eccentrically on the pinion 72. The pivot pin 74 of this poinion extends radially with respect to the optical axis and is secured to a stationary ring 76, the two pointer rings 34e and 36e (corresponding in general to the previous rings 34 and 36) being disposed at either side of the ring 76 in meshing engagement with opposite sides of the pinion 72. The pinion 72 therefore functions as a reversing gear between the two driven pointer rings 34 and 36. By adjusting the aperture setting ring 40, the pin 70 sliding in the slot 39 drives the pinion 72 in one direction or the other, to move the pointers 34a and 36a toward or away from each other in dependence upon the aperture being set. The focusing mechanism in FIG. 2 is independent of the diaphragm and comprises a tube 2 provided with an internal thread 4 and a focusing scale 6. The tube 2 may be manually adjusted by grasping and rotating a milled edge 2a.

The advantages of this second form of the invention are that at least one component part is eliminated as compared to the first embodiment of FIG. 1. The general design is sturdy without taking up additional space. The axial length of the mechanism, which is governed by the diameter of gear wheel 72, does not exceed the overall length of a conventional objective shutter mechanism which can be accommodated inside the stationary ring 76. Pointer arm 34a in any case extends axially inside the ring 76 and it is positively coupled with the diaphragm. It is also possible to use pointer ring 36e in FIG. 2 as the sun wheel of a differential gear in the same way as pointer ring 34 in FIG. 1, thus providing a device which operates similar to that of FIG. 1. The invention offers possibilities for simplification in the structure and manipulation of a camera, and in producing inexpensive cameras which are easy to control.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A photographic camera having an optical axis and comprising a focusing tube mounted for adjustment by rotation about the optical axis, a focusing scale graduated circumferentially about the periphery of said focusing tube, a fixed index mark with reference to which the focusing scale may be set, a depth of field indicating device comprising a pair of pointer rings mounted for rotation about the optical axis and each having an axially extending arm for indicating a value on said focusing scale, a differential ring having a radial pin on which a tangentially extending pinion is pivoted, said pinion being in meshing engagement with one of said pointer rings, a diaphragm aperture setting ring mounted for manual adjustment by rotation about the optical axis, a control ring coupled for rotation with said setting ring, means also meshing with said pinion and operatively connected with said focusing tube for operatively connecting said focusing tube permanently to said differential ring to be turned by turning movement of said differential ring, and means for driving said pointer rings from rotation of said aperture setting ring and control ring so that said pointer arms mutually move toward one another upon rotation in one direction and mutually move away from one another upon rotation in the other direction, one of said pointer arms indicating the near limit of clear definition while the other of said pointer arms indicates the distant limit of clear definition, the parts being so proportioned that when said diaphragm aperture setting ring is turned while said differential ring remains stationary, said two pointer rings will turn in opposite directions and said focusing tube will turn in the same direction and at the same speed as one of said depth of field indicating arms, so that such arm will continue to indicate the same value on said focusing scale.

2. A photographic camera having an optical axis and comprising a focusing tube mounted for adjustment by rotation about the optical axis, a focusing scale graduated circumferentially about the periphery of said focusing tube, a depth of field indicating device comprising a pair of pointer rings mounted for rotation about the optical axis and each having a pointer for indicating a value on said focusing scale, a diaphragm aperture setting ring mounted for manual adjustment by rotation about the optical axis, a control ring coupled for rotation with said setting ring, a differential ring mounted for rotation, said differential ring being geared with one of said pointer rings and with said focusing tube to set a desired focus distance upon rotation thereof, and means for coupling said pointer rings and said control ring so that adjustment of said aperture setting ring in one direction moves said pointers mutually toward one another while adjustment of said aperture setting ring in the other direction moves said pointers mutually away from one another, rotation of said one pointer ring being transmitted during the aperture adjustment to cause an adjustment of said focusing tube.

3. A construction as defined in claim 2, wherein said pointers comprise an axially extending arm on each of said pointer rings, and wherein said means coupling said pointer rings and control ring includes a pair of pinions mounted on fixed bearings and each in meshing engagement with its respective pointer ring, a driving pin fixed to each of said pinions, and a pair of cam slots in said control ring each slidably engaged by one of said driving pins.

4. A construction as defined in claim 2, wherein the gearing between said differential ring and said one pointer ring and said focusing tube is provided by a tangential spur wheel rotatable about a radial pin on the circumference of said differential ring.

5. A photographic camera having an optical axis and comprising a focusing tube mounted for adjustment by rotation about the optical axis, a focusing scale graduated circumferentially about the periphery of said focusing tube, a depth of field indicating device comprising a pair of pointer rings mounted for rotation about the optical axis and each having a pointer for indicating a value on said focusing scale, a diaphragm aperture setting ring mounted for manual adjustment by rotation about the optical axis, a focus adjusting ring also mounted for rotation about said optical axis, and means including differential gearing operatively connecting said focusing tube, said depth of field pointer rings, said aperture setting ring, and said focus adjusting ring to each other for turning said focusing tube and one of said depth of field pointer rings simultaneously in the same direction and to the same extent by rotary movement of said aperture setting ring while said focus adjusting ring remains stationary, and for turning said focusing tube without movement of said depth of field pointer rings by rotary movement of said focus adjusting ring while said aperture setting ring remains stationary.

References Cited in the file of this patent

UNITED STATES PATENTS

| | | |
|---|---|---|
| 2,315,977 | Mihalyi | Apr. 26, 1943 |
| 2,342,819 | Priesmann | Feb. 29, 1944 |
| 2,536,500 | Hinden | Jan. 2, 1951 |
| 2,887,939 | Gebele et al. | May 26, 1959 |
| 2,901,956 | Werner | Sept. 1, 1959 |
| 2,917,983 | Gebele et al. | Dec. 22, 1959 |
| 2,975,692 | Rentschler | Mar. 21, 1961 |